(12) United States Patent
Kobayashi

(10) Patent No.: US 10,638,103 B2
(45) Date of Patent: Apr. 28, 2020

(54) IMAGE PROJECTION APPARATUS, CONTROL METHOD OF THE IMAGE PROJECTION APPARATUS, AND STORAGE MEDIUM

(71) Applicant: CANON KABUSHIKI KAISHA, Tokyo (JP)

(72) Inventor: Keisuke Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/915,447

(22) Filed: Mar. 8, 2018

(65) Prior Publication Data

US 2018/0262728 A1  Sep. 13, 2018

(30) Foreign Application Priority Data

Mar. 10, 2017 (JP) ................. 2017-045910

(51) Int. Cl.
*H04N 9/31* (2006.01)
*G03B 21/14* (2006.01)
*H04N 5/232* (2006.01)

(52) U.S. Cl.
CPC ......... *H04N 9/3185* (2013.01); *G03B 21/142* (2013.01); *G03B 21/147* (2013.01);
(Continued)

(58) Field of Classification Search
CPC .... H04N 9/3185; H04N 9/3105; H04N 9/312; H04N 9/3161; H04N 9/3164;
(Continued)

(56) References Cited

U.S. PATENT DOCUMENTS 7,004,590 B2 * 2/2006 Kitabayashi ........... G03B 21/14
348/746
7,070,286 B2 * 7/2006 Koyama .............. H04N 9/3182
345/600
(Continued)

FOREIGN PATENT DOCUMENTS

EP          1914983 A2    4/2008
JP      2010103886 A     5/2010
(Continued)

OTHER PUBLICATIONS

Extended European Search Report issued in European Application No. 18000229.7 dated Sep. 4, 2018.
(Continued)

*Primary Examiner* — Brian P Yenke
(74) *Attorney, Agent, or Firm* — Rossi, Kimms & McDowell LLP

(57) ABSTRACT

An image projection apparatus displays includes a lens attachable portion to which a plurality of projection lenses having different optical characteristics are interchangeably attached, a drive signal producer configured to produce, for each color light beam, a drive signal used to drive the light modulation element based on an input image signal, and an information acquirer configured to acquire information on an optical characteristic of the projection lens attached to the lens attachable portion. The information on the optical characteristic of the projection lens contains information on a chromatic aberration of the projection lens. The drive signal producer reduces influence of a shift below the modulation pixel caused by the chromatic aberration of the projection lens by using the information on the optical characteristic, and produces the drive signal corresponding to at least one of the plurality of color light beams.

11 Claims, 4 Drawing Sheets

(52) U.S. Cl.
CPC ........... *H04N 9/312* (2013.01); *H04N 9/3105* (2013.01); *H04N 9/3161* (2013.01); *H04N 9/3164* (2013.01); *H04N 9/3182* (2013.01); *H04N 9/3194* (2013.01); *G03B 2206/00* (2013.01); *H04N 5/23209* (2013.01)

(58) Field of Classification Search
CPC ...... H04N 9/3194; G02B 13/16; G03B 17/14; G03B 21/142; G03B 27/522; G06T 5/006; G06T 3/0093
See application file for complete search history.

(56) References Cited

U.S. PATENT DOCUMENTS

| | | | | |
|---|---|---|---|---|
| 8,040,441 | B2* | 10/2011 | Nishida | H04N 9/317 348/744 |
| 8,144,168 | B2* | 3/2012 | Aragaki | G02B 27/1046 345/581 |
| 8,248,434 | B2 | 8/2012 | Aragaki et al. | |
| 8,297,760 | B2* | 10/2012 | Aragaki | H04N 9/3182 353/101 |
| 8,416,259 | B2* | 4/2013 | Aragaki | G02B 27/1046 345/581 |
| 8,702,243 | B2 | 4/2014 | Ishii | |
| 8,963,941 | B2* | 2/2015 | Aragaki | G02B 27/1046 345/547 |
| 9,406,111 | B2* | 8/2016 | Aragaki | G02B 27/1046 |
| 9,578,294 | B2* | 2/2017 | Tsukagoshi | H04N 9/3185 |
| 9,936,179 | B2* | 4/2018 | Matsuno | H04N 9/317 |
| 10,466,574 | B2* | 11/2019 | Kobayashi | H04N 9/3194 |
| 2002/0080289 | A1* | 6/2002 | Koyama | H04N 9/3182 349/5 |
| 2002/0089759 | A1* | 7/2002 | Kitabayashi | G02B 27/1046 359/649 |
| 2003/0067589 | A1 | 4/2003 | Kimura | |
| 2004/0263807 | A1* | 12/2004 | Kitabayashi | G03B 21/14 353/122 |
| 2009/0122070 | A1* | 5/2009 | Aragaki | G02B 27/1046 345/589 |
| 2009/0244493 | A1* | 10/2009 | Aragaki | H04N 9/3182 353/69 |
| 2009/0263018 | A1* | 10/2009 | Murakami | G06T 3/0093 382/167 |
| 2010/0026899 | A1* | 2/2010 | Aragaki | H04N 9/3105 348/607 |
| 2010/0033405 | A1* | 2/2010 | Aragaki | G09G 3/001 345/55 |
| 2011/0080565 | A1* | 4/2011 | Sugawara | G02B 7/023 353/69 |
| 2011/0292351 | A1* | 12/2011 | Ishii | H04N 9/3185 353/69 |
| 2012/0147056 | A1* | 6/2012 | Aragaki | G02B 27/1046 345/672 |
| 2012/0182416 | A1* | 7/2012 | Kawaguchi | H04N 9/3185 348/128 |
| 2012/0218527 | A1* | 8/2012 | Hatakeyama | G03B 21/142 353/101 |
| 2013/0124159 | A1* | 5/2013 | Chen | G06T 5/006 703/2 |
| 2013/0187945 | A1* | 7/2013 | Aragaki | G02B 27/1046 345/619 |
| 2015/0022789 | A1* | 1/2015 | Sato | G03B 21/145 353/98 |
| 2015/0123989 | A1* | 5/2015 | Aragaki | G02B 27/1046 345/619 |
| 2015/0199795 | A1* | 7/2015 | Naruse | H04N 5/217 382/260 |
| 2016/0027155 | A1* | 1/2016 | Naruse | H04N 1/409 382/167 |
| 2016/0044289 | A1* | 2/2016 | Matsuno | H04N 9/317 348/745 |
| 2016/0189352 | A1* | 6/2016 | Slutsky | H04N 5/345 382/275 |
| 2016/0307483 | A1* | 10/2016 | Aragaki | G02B 27/1046 |
| 2016/0316182 | A1* | 10/2016 | Kato | H04N 9/3111 |
| 2018/0003949 | A1* | 1/2018 | Kawahara | G02B 26/08 |
| 2018/0220115 | A1* | 8/2018 | Kitagawa | H04N 9/3182 |
| 2019/0025677 | A1* | 1/2019 | Kobayashi | G03B 21/142 |
| 2019/0313066 | A1* | 10/2019 | Kobayashi | G03B 21/206 |

FOREIGN PATENT DOCUMENTS

| | | |
|---|---|---|
| JP | 2011077972 A | 4/2011 |
| JP | 2011158658 A | 8/2011 |
| JP | 2012137673 A | 7/2012 |
| JP | 5251201 B2 | 7/2013 |

OTHER PUBLICATIONS

Office Action issued Japanese Appln. No. 2017-045910 dated Jun. 12, 2018. English translation provided.

* cited by examiner

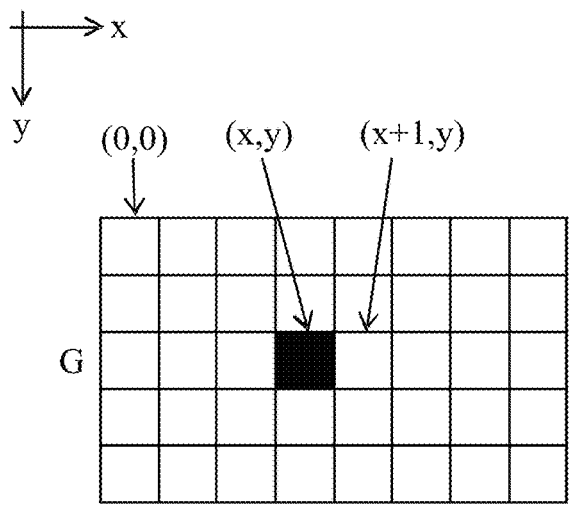
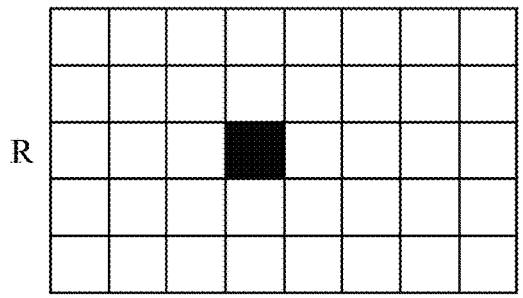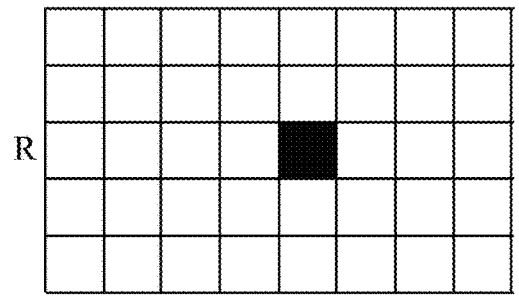
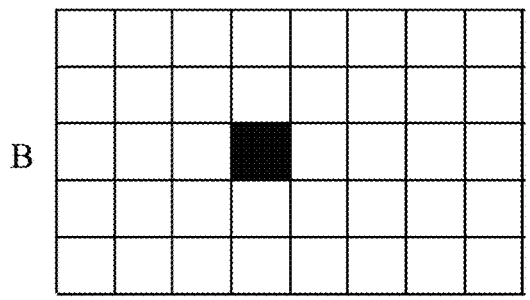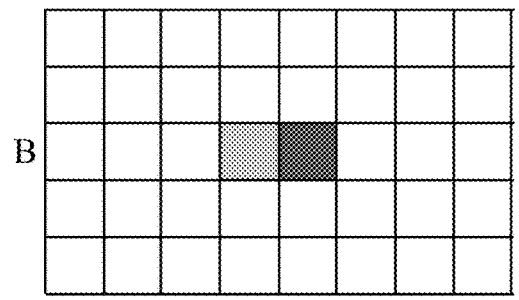
FIG. 5A  FIG. 5B

IMAGE PROJECTION APPARATUS, CONTROL METHOD OF THE IMAGE PROJECTION APPARATUS, AND STORAGE MEDIUM

BACKGROUND OF THE INVENTION

Field of the Invention

The present invention relates to an image projection apparatus (referred to as a "projector" hereinafter) to which a projection lens can be interchangeably attached.

Description of the Related Art

A projector splits or separates white light from a light source, into red (R) light, green (G) light, and blue (B) light, guides them to light modulation elements, such as liquid crystal panels, combines the R light, the G light, and the B light modulated by these light modulation elements, and projects the combined light to a target plane, such as a screen, through a projection lens. Thereby, a projected image is displayed as a colored image. One pixel in the projected image includes sub pixels (R sub pixel, G sub pixel, and B sub pixel) which each of the R light, the G light, and the B light forms.

However, due to the optical characteristic, such as a chromatic aberration of the projection lens, positions of the R, G, and B sub pixels that form one pixel shift from one another in the projected image. This pixel shift (registration shift) particularly stands out in displaying a high-resolution projected image.

Japanese Patent No. 5,251,201 discloses a method for correcting a pixel value of each sub pixel in accordance with a shift amount among the sub pixels in a reference pixel in the projected image. Japanese Patent Laid-Open No. 2010-103886 discloses a method for correcting an image signal corresponding to each sub pixel according to a zoom state when a chromatic aberration changes before and after the zoom state (zoom adjustment amount) is changed.

In a projector to which the projection lens can be interchangeably attached, the registration shift depends on the optical characteristic, such as a chromatic aberration of the projection lens to be used. Thus, the method disclosed in Japanese Patent No. 5,251,201 and Japanese Patent Laid-Open No. 2010-103886 cannot fully correct the registration shift for each interchangeable projection lens.

SUMMARY OF THE INVENTION

The present invention provides an image projection apparatus that can well correct a registration shift for each projection lens to be exchanged.

An image projection apparatus according to one aspect of the present invention is configured to display a projected image by modulating a plurality of color light beams through a light modulation element that includes a plurality of modulation pixels and by projecting the color light beams through a projection lens. The image projection apparatus includes a lens attachable portion to which a plurality of projection lenses having different optical characteristics are interchangeably attached, a drive signal producer configured to produce, for each color light beam, a drive signal used to drive the light modulation element based on an input image signal, and an information acquirer configured to acquire information on an optical characteristic of the projection lens attached to the lens attachable portion. The information on the optical characteristic of the projection lens contains information on a chromatic aberration of the projection lens. The drive signal producer reduces influence of a shift below the modulation pixel caused by the chromatic aberration of the projection lens by using the information on the optical characteristic, and produces the drive signal corresponding to at least one of the plurality of color light beams.

Further features of the present invention will become apparent from the following description of exemplary embodiments with reference to the attached drawings.

BRIEF DESCRIPTION OF THE DRAWINGS

FIGS. 5A and 5B illustrate a correction of a panel drive signal according to the first embodiment.

DESCRIPTION OF THE EMBODIMENTS

A description will now be given of embodiments according to the present invention with reference to the accompanying drawings.

First Embodiment

Figure 1:
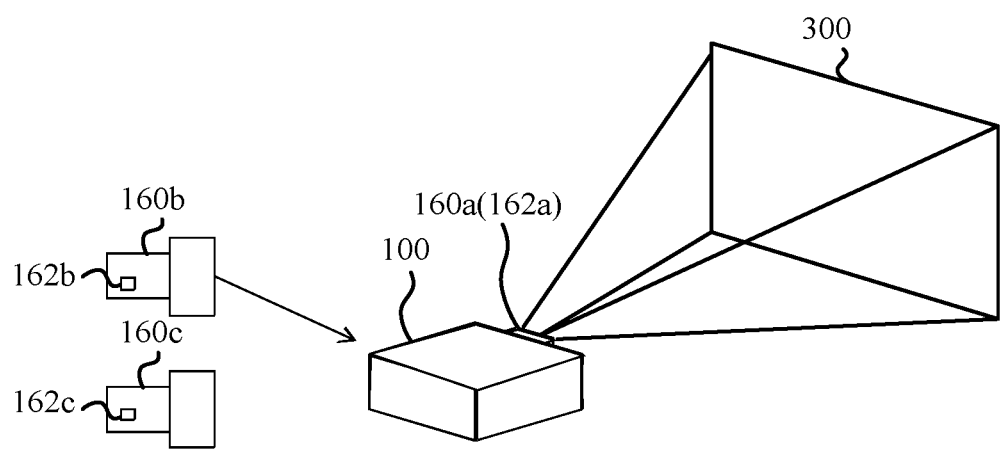
FIG. 1 illustrates a usage mode of a projector according to a first embodiment of the present invention.

FIG. 1 illustrates an overview of a projector 100 as an image projection apparatus according to a first embodiment of the present invention. The projector 100 displays a projected image 300 on a screen (not shown) as a target plane through a projection lens 160a.

A plurality of projection lenses 160a, 160b, and 160c can be interchangeably attached to the projector 100 so as to change the size (zoom ratio) and resolution of the projected image 300. These multiple projection lenses 160 (160a, 160b, 160c) have different optical characteristics, such as an aberration (e.g., a chromatic aberration), and a resolution performance.

The projector 100 includes a lens shift mechanism that can vertically and laterally move (shift) the display position (projection position) of the projected image 300 by shifting the projection lens 160 in a direction orthogonal to the optical axis.

Each projection lens 160 includes a focus mechanism that provides focusing by moving a focus lens in an optical axis direction, and a zoom mechanism that changes (enlarges or reduces) the size of the projected image 300 by moving a magnification varying lens (zooming lens) in the optical axis direction. Each projection lens 160 may include a mirror to change an image projection direction or for an autofocus function.

The projector 100 splits or separates the white light emitted from the light source into multiple (three) color beams or a red (R) light, a green (G) light, and a blue (B) light, and modulates the R light, the G light, and the B light through three display panels (light modulation elements). The display panel is driven by a panel drive signal produced based on an input image signal input from the outside of the projector 100. This embodiment produces a panel drive signal for each color light (display panel).

The projector 100 combines the R light, G light and the B light modulated by the three display panels, and projects the combined light onto the screen through the projection lens 160 so as to display the colored projected image. The display panel 150 may use a liquid crystal panel in which a plurality of modulation pixels are arranged in a matrix.

Thus, the projected image 300 is displayed by the combined light of the R light, the G light, and the B light, and thus the R sub pixel, the G sub pixel, and the B sub pixel in the same display pixel may shift in position from one another in accordance with the optical characteristic, such as the chromatic aberration, of the projection lens 160. Due to this pixel shift or registration shift, the projected image 300 suffers from an image quality deterioration, such as a display of an false color and a blurred contour which are unexpected in the input image signal.

The projection lens 160 (160a, 160b, and 160c) includes a lens memory 162 (162a, 162b, and 162c). The lens memory 162 stores information on an optical characteristic of the projection lens 160. More specifically, the lens memory 162 stores, as the optical characteristic, the information on the chromatic aberration and a variety of other aberrations, such as shift amounts among the R, G, and B sub pixels in the same display pixel. More specifically, the lens memory 162 stores shift amounts (referred to as a "registration shift amounts" hereinafter) of the R sub pixel and the B sub pixel formed by other color light to the G sub pixel formed by the G light as reference color light.

When the projection lens 160 is interchangeably attached to the projector 100, the projector 100 reads the registration shift amounts of the R sub pixel and the B sub pixel out of the lens memory 162 for the projection lens 160 (referred to as an "R registration shift amount" and a "B registration shift amount" hereinafter). Using these R and B registration shift amounts, the panel drive signals (as a panel drive signal corresponding to at least one color light beam among the multiple color light beams) for driving the R-light and B-light display panels are corrected (produced). This configuration can reduce the registration shift caused by a chromatic aberration that is different for each projection lens 160 attached to the projector 100.

In other words, the panel drive signal corresponding to the attached projection lens 160 is corrected and the high-quality projected image 300 can be displayed with a reduced registration shift irrespective of the optical characteristic of the projection lens 160. In addition, the panel drive signal is automatically corrected in accordance with the projection lens 160 whenever the projection lens 160 exchanged without requiring the user of the projector 100 to change the settings and to make an adjustment operation.

Figure 2:
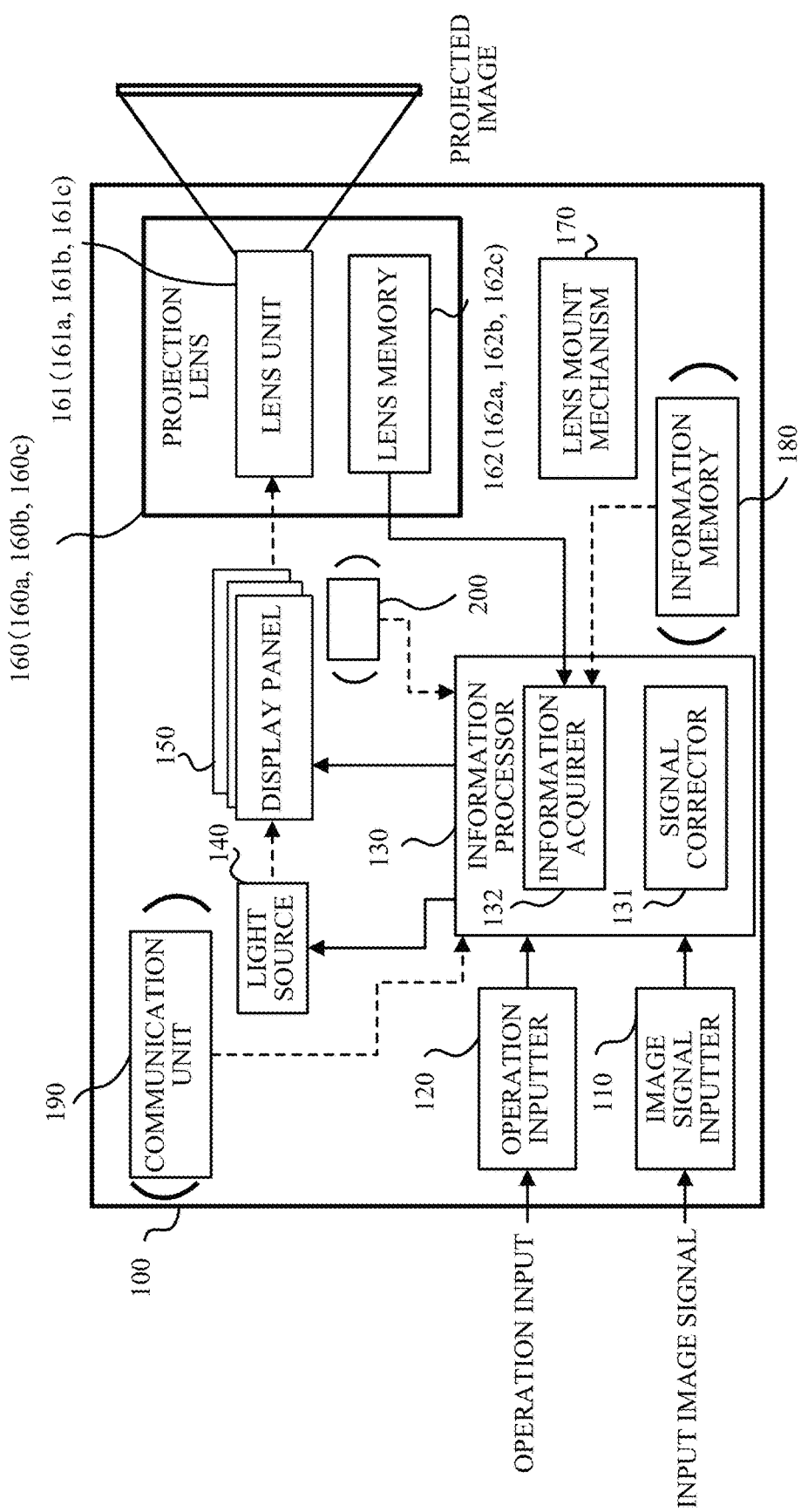
FIG. 2 is a structural block diagram of the projector according to the first embodiment.

Referring now to FIG. 2, a description will be given of a concrete configuration of the projector 100. A light source 140 includes a lamp, a laser diode, an LED, etc., and emits white light. The white light is split into the R light, the G light, and the B light by an unillustrated color splitting optical system, and these lights are guided to three display panels 150 (referred to as an R panel, a G panel, and a B panel hereinafter). Each of the R, G, and B panels 150 includes a liquid crystal panel (transmission type or reflection type liquid crystal panel) having, for example, 1920× 1080 (full HD) modulation pixels, and modulates a corresponding one of the R, G, and B lights incident on each modulation pixel in response to the panel drive signal. The modulated R, G, and B light beams are combined through an unillustrated color combining optical system and projected onto the screen through the projection lens 160. Thereby, the projected image 300 is displayed.

An image signal inputter 110 includes terminals to which an input image signal, such as a composite image signal, a DVI image signal, and an HDMI image signal, is input from the outside through a wired communication, and receivers for receiving the signal through a radio communication. The input image signal includes an R image signal, a G image signal, and a B image signal. The input image signal input to the image signal inputter 110 is sent to an information processor 130.

An operation inputter 120 includes a button operated by a user, and a remote control receiver for receiving a light signal (remote signal) from a remote controller for remotely operating the projector 100, etc., and outputs an operation signal in accordance with a reception of a user operation or a remote signal. Due to the operation signal, the power on/off, the selection of the projection mode, a (vertical and lateral) shift direction of the projected image, etc. is commanded.

An information processor (drive signal producer) 130 is comprised of a microcomputer that includes a CPU, a RAM, and a ROM, and further includes a signal corrector 131 and an information acquirer 132. The information processor 130 performs image processing, such as a brightness correction, a contrast correction, a gamma correction, a color conversion, and a resolution conversion, for the input image signal. Moreover, the image processor 130 produces the R, G, and B panel drive signals as a panel drive signal corresponding to each of the three display panels (R, G, and B panels) 150 based on the image-processed R, G, and B image signals. The information processor 130 controls a variety of operations for the projector 100 in accordance with the operation signal from the operation inputter 120.

The projection lens 160 (160a, 160b, 160c) that includes the lens unit 161 (161a, 161b, 161c) as an optical system and the lens memory 162 (162a, 162b, 162c) is interchangeably attached to a lens mount mechanism (lens attachable portion) 170. The lens mount mechanism 170 includes the above lens shift mechanism. The lens units 161 of the projection lenses 160 have different optical characteristics. The lens memory 162 includes a nonvolatile memory, such as an EEPROM and a flash memory.

The information acquirer 132 acquires information (the above R and B registration shift amounts) on the optical characteristic of the lens unit 161 in the projection lens 160 from the lens memory 162 in the attached projection lens 160. The information acquirer 132 serves as an exchange detector and compares lens identification information (referred to as "lens ID" hereinafter) used to identify the projection lens 160 acquired from the lens memory 162 with the previously stored lens ID. If the compared lens ID is different from each other, the exchange of the projection lens 160 can be detected. The lens ID may contain a type name and a manufacturing number of the projection lens 160.

The signal corrector 131 corrects signal values of the R and the B panel drive signals by using the R and B registration shift amounts. Thereby, the R panel drive signal used to drive the R panel, the G panel drive signal used to drive the G panel, and the B panel drive signal used to drive the B panel are finally produced. Thereby, when the R, G, and B panel drive signals are input into the R, G, and B panels 150, the projected image 300 has a reduced registration shift.

The projection lens 160 may include a zoom function that moves a magnification varying lens and changes the size of the projected image 300. The projection lens 160 may include a focusing function that changes an in-focus projection distance and curves an in-focus projection area.

Moreover, the projection lens 160 may change the projection direction by using a mirror that reflects the light emitted from the lens unit 161.

Figure 3:
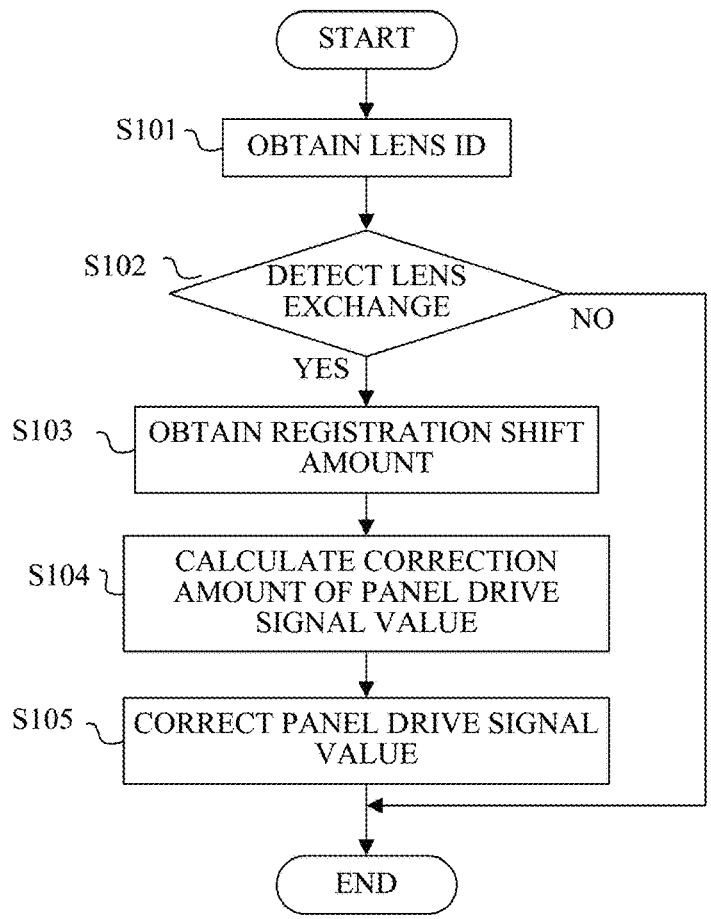
FIG. 3 is a flowchart of image projection control processing for the projector according to the first embodiment.

Next, image projection control processing performed by the information processor 130 will be described with reference to a flowchart illustrated in FIG. 3. The information processor 130 executes this processing in accordance with an image projection control program as a computer program.

At the step S101, the information processor 130 (information acquirer 132) acquires the lens ID from the lens memory 162 in the projection lens 160 attached to the lens mount mechanism 170. In this case, the information processor 130 may directly read the lens ID from the lens memory 162 or may acquire the lens ID through a communication with the unillustrated microcomputer mounted with the projection lens 160. The information processor 130 may acquire the lens ID and the registration shift amount periodically or regularly after or when the projector 100 is started.

At the step S102, the information processor 130 compares the lens ID acquired at the step S101 with the previously acquired lens ID. If these lens IDs are different from each other, the exchange of the projection lens 160 is detected. As described above, when the lens ID is regularly acquired, the exchange can be detected even when the projection lens 160 is exchanged in the image projection. With no exchange detected, the information processor 130 ends this processing.

The information processor 130 (information acquirer 132) that has detected the exchange of the projection lens 160 acquires the registration shift amount from the lens memory 162 at the step S103 (information acquiring step S). This step provides the information acquiring processing. The registration shift amount, as used herein, is an R registration shift amount and the B registration shift amount, as described above. Again, the information processor 130 may read the registration shift amount directly from the lens memory 162, or may acquire the registration shift amount through a communication with the unillustrated microcomputer mounted onto the projection lens 160.

The projection lens 160 having the lens memory 162 that stores the registration shift amount enables the information processor 130 to acquire the registration shift amount, even when the projection lens 160 is initially attached to the projector 100. In other words, even when a new projection lens 160 is used, the registration shift can be reduced in the projected image.

Figures 4A, 4B:
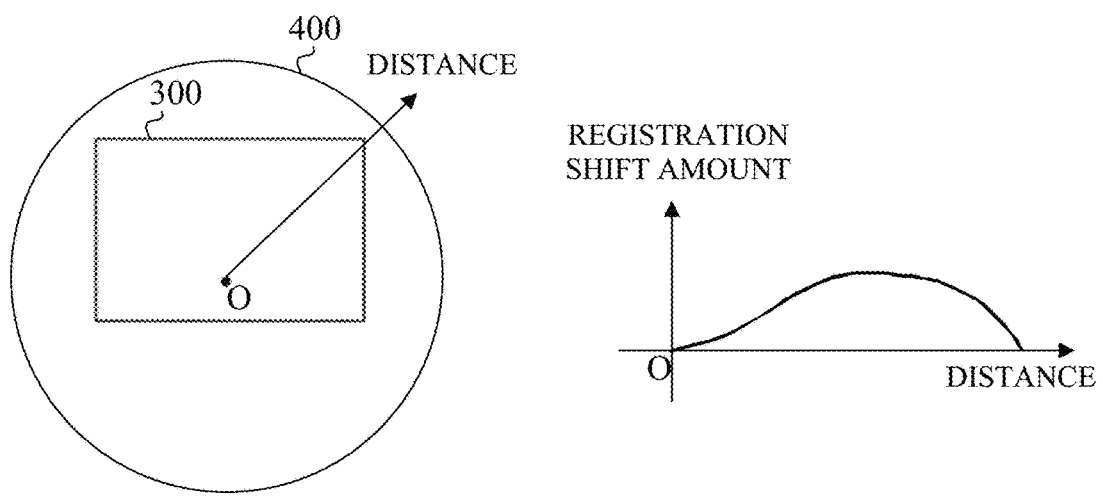
FIGS. 4A and 4B illustrate a registration shift amount according to the first embodiment.

Referring now to FIGS. 4A and 4B, a detailed description will be given of the registration shift amount. The registration shift amounts correspond to the shift amounts in the R, G, and B sub pixels in the same display pixel in the projected image 300 when the RGB light beams from the display panels 150 are displayed on the screen through the projection lens 160 and the projected image 300 is displayed. In this embodiment, this corresponds to a shift amount of each of the R and B sub pixels when the G sub pixel is used as a reference. The registration shift amount may be expressed by a sub pixel unit like one sub pixel and 0.1 sub pixel, and a length unit, such as millimeters.

FIG. 4A illustrates the projected image 300 displayed on the screen as the plane orthogonal to the optical axis of the projection lens 160, and an image circle 400 of the projection lens 160 (lens unit 161) on the screen (on the same plane). The image circle 400 is an area in which a proper image is displayed as the projected image formed by the light entering the lens unit 161 in a permissible range of a light amount drop, a color separation, a surrounding distortion etc. A normal image having no image defect etc. can be displayed inside the image circle 400, even when the display position of the projected image 300 is shifted by the above lens shift mechanism.

If it is assumed that a point O is an intersection between the screen and the optical axis of the projection lens 160, the registration shift amount caused by the chromatic aberration of the projection lens 160, etc., can be expressed as a value corresponding to a distance from the point O. In FIG. 4B, an abscissa axis denotes a distance from the point O (image height) on the screen, and an ordinate axis denotes a registration shift amount in the surrounding direction from the point O in the R or B sub pixel as the sub pixel of the other color light beam to the G sub pixel as the sub pixel of the reference color light at the predetermined image height position.

The lens memory 162 may store a formula or approximation function used to calculate the registration shift amount as well as the registration shift amount as a numerical value. Alternatively, the registration shift amount at a representative distance from the point O may be stored as table data and the registration shift amount at another distance may be acquired or calculated through an interpolation operation.

Next, at the step S104, the information processor 130 (signal corrector 131) calculates correction amounts for the R and B panel drive signals by using the registration shift amounts acquired at the step S103. Referring now to FIGS. 5A and 5B, a description will be given of a calculation example of the correction amounts for the R and B panel drive signals.

FIG. 5A illustrates signal values (referred to as drive signal values hereinafter) for the GRB panel drive signals for driving the G, R, and B panels when the input image signal expresses an image that contains a dot in one pixel (referred to as an "input dot" hereinafter). In the G, R, and B panel drive signals, a drive signal value for a modulation pixel (x, y) corresponding to the input dot is 0, and the drive signal values at other surrounding modulation pixels are 100. When there are no R and B registration shifts relative to G, one pixel can express a dot similar to the input image signal in a projected image in which light beams modulated by the G, R, and B panels driven by the G, R, and B panel drive signals illustrated in FIG. 5A are combined and displayed can express.

On the other hand, where there is a registration shift, the positions of the R and B sub pixels displaying the dot do not accord with each other relative to the G sub pixel that displays the dot in the projected image, and the dot is not displayed as one pixel. For example, assume that the R registration shift amount relative to the modulation pixel (x, y) which the information processor 130 acquires at the step S103 is one sub pixel in the −x direction. At this time, the information processor 130 calculates, as illustrated in FIG. 5B, a correction amount for the R panel drive signal so that the position of the modulation pixel corresponding to the input dot shifts by one sub pixel in the +x direction in the R panel. In other words, the information processor 130 calculates the correction amount for the R panel drive signal so that the drive signal values for the modulation pixel (x, y) and the adjacent modulation pixel (x+1, y) in the +x direction have 100 and 0, respectively.

Assume that the B registration shift amount relative to the modulation pixel (x, y) acquired at the step S103 by the information processor 130 is, for example, 0.7 sub pixel in the −x direction. At this time, the information processor 130 calculates, as illustrated in FIG. 5B, a correction amount for the B panel drive signal so that the modulation pixel (x, y) in the B panel has a drive signal value of 70 and the adjacent modulation pixel (x+1, y) in the +x direction has a drive signal value of 30.

Due to this correction, the position of the dot displayed by the R sub pixel accords with that displayed by the G sub pixel. In addition, the dot is displayed by the B sub pixel only with a positional shift smaller than 0.7 sub pixel as the pseudo B registration shift amount relative to the dot displayed by the G sub pixel.

When the input image signal contains a normal image other than the image that includes only one dot, a similar calculation of the correction value is performed for the drive signal value of the whole modulation pixel or the representative modulation pixel. The correction amount for the drive signal value of the modulation pixel other than the representative modulation value may be calculated by the interpolation calculation using the correction amount for the drive signal value of the representative modulation pixel.

Next, at the step S105, the information processor 130 corrects the R and B panel drive signals by using the correction amounts calculated at the step S104. In other words, the information processor 130 finally produces the corrected R and B panel drive signals input into the R and B panels. The corrected R and B panel drive signals and the G panel drive signal are input into the RGB panels and the displayed projected image has a reduced registration shift. These steps S104 and S105 provide drive signal generating processing.

This embodiment can automatically reduce the registration shift caused by the optical characteristic of the projection lens 160 irrespective of the optical characteristic of the projection lens 160 attached to the projector 100.

Second Embodiment

Next follows a description of a second embodiment according to the present invention or a variation of the first embodiment. In the first embodiment, the information processor 130 corrects the panel drive signal when the step S102 in FIG. 3 detects the exchange of the projection lens 160, but may provide a correction at a different timing. For example, whenever the projector 100 starts an image projection, the registration shift amount may be acquired from the projection lens 160 and the panel drive signal may be corrected. The image projection with a reduced registration shift can start even when the projection lens 160 is exchanged before the image projection through a correction when each image projection starts.

When the projection lens 160 is shifted by the lens shift mechanism and the projected image 300 shifts in the image circle 400 illustrated in FIG. 4A, a registration shift amount changes in each display pixel in the projected image 300. Accordingly, the information processor 130 may acquire the shift amount of the projection lens 160 by a lens shift mechanism through a shift position sensor etc., and correct the panel drive signal by using the shift amount and the registration shift amount. In this case, when the lens memory 162 stores the registration shift amount at each position in the image circle 400, the registration shift amount can be easily acquired at the predetermined image height position in the projected image 300 for each shift amount. In other words, since the image processor 130 acquires the registration shift amount corresponding to the shift amount from the lens memory 162 whenever the shift amount is changed, the panel drive signal can be automatically corrected based on the shift amount.

The chromatic aberration amount of the projection lens 160 changes in accordance with the zoom state of the projection lens 160. Thus, the information processor 130 acquires the zoom information as information on the zoom state of the projection lens 160 having the zoom function, through the zoom position sensor in the projection lens 160, and corrects the panel drive signal using the zoom information and the registration shift amount. In that case, the registration shift amount can be easily acquired at the predetermined image height position in the projected image 300 for each zoom state by storing the registration shift amount in each zoom state in the lens memory 162. In other words, the information processor 130 automatically corrects the panel drive signal based on the zoom state by acquiring the registration shift amount from the lens memory 162, which corresponds to the zoom state (zoom information) whenever the zoom state is changed.

Since the projector 100 allows light having a high light intensity to pass through the projection lens 160, the lens expands or contracts as the temperature changes and the chromatic aberration amount may change. Accordingly, as illustrated by parentheses in FIG. 2, a temperature sensor (temperature acquirer) 200 provided near the projection lens 160 may acquire a lens temperature as temperature information representing the temperature of the projection lens 160 (lens unit 161). Instead of directly acquiring the lens temperature through the temperature sensor 200, a function as a temperature acquirer may be provided which estimates the lens temperature based on the light quantity from the light source and/or a display state of the display image. The information processor 130 may correct the panel drive signal by using the acquired lens temperature and registration shift amount. In this case, when the lens memory 162 may store the registration shift amount for each lens temperature, a registration shift amount can be easily acquired at a predetermined image height position in the projected image 300 for each lens temperature. In other words, the information processor 130 acquires the registration shift amount corresponding to the expanded state of the lens unit 161 from the lens memory 162 whenever the lens temperature changes, and automatically corrects the panel drive signal in accordance with the expanded state of the lens unit 161.

The first embodiment stores the registration shift amount in the lens memory 162 in the projection lens 160. However, as illustrated by parenthesis in FIG. 2, the projector 100 may include an information memory 180 that stores the registration shift amounts of the plurality of projection lenses 160. In this case, the information processor 130 reads out of the information memory 180, the registration shift amount corresponding to the lens ID acquired by the lens memory 162. Instead of acquiring the lens ID, the projection lens 160 may be determined based on a connection and a disconnection of electric contacts provided on the lens mount mechanism 170 and the projection lens 160, and the registration shift amount corresponding to the determination result may be read out of the information memory 180. Thereby, even if the projection lens has no lens memory for storing the registration shift amount, the registration shift can be reduced for the projection lens.

The projection lens 160 or the projector 100 may not necessarily have a memory for storing the registration shift amount. For example, as illustrated by parenthesis in FIG. 2, the projector 100 may include a communication unit 190 that can communicate information with an external network device through a wired or wireless LAN etc., and the registration shift amount of the projection lens 160 may be obtained through the communication with the network device. The registration shift amount may be read out and acquired from an external memory, such as an USB memory.

The first embodiment uses the three RGB display panels 150, but the number of display panels 150 may be four or more where these panels contain a display panel for a color (wavelength) other than the RGB colors. An infrared panel may be used for the wavelength display panel other than the RGB.

Instead of the three display panels, one digital micro mirror device may be used to receive, modulate, and project the R light, the G light, and the B light in time-sequential manner. The image projection control processing described in the first embodiment and this embodiment is effective to a reduced registration shift when the digital micro mirror device is used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045910, filed on Mar. 10, 2017, which is hereby incorporated by reference herein in its entirety.

What is claimed is:

1. An image projection apparatus configured to display a projected image on a projection target surface by modulating a plurality of color light beams through at least one light modulation element that includes a plurality of modulation pixels and by projecting the color light beams through a projection lens included among a plurality of attachable projection lenses having mutually different optical characteristics, the image projection apparatus comprising:

a lens attachable portion to which one of the plurality of attachable projection lenses can interchangeably be attached for use as the projection lens;

a processor; and a memory configured to store instructions that when executed by the processor, cause the image projection apparatus to:

produce, for each color light beam, a drive signal used to drive the at least one light modulation element based on an input image signal; and acquire information on the optical characteristic of the projection lens attached to the lens attachable portion, wherein influence of a display pixel shift on the projected image whose amount is smaller than a size of a display pixel on the projected image caused by a chromatic aberration of the attached projection lens is reduced by producing drive signal values of modulation pixels using the information on the optical characteristic, and wherein the information on the optical characteristic indicates the amount of the display pixel shift at each of a plurality of points of the projected image, the amount of the display pixel shift being expressed as a value corresponding to a distance to each of the plurality of points of the projected image from an intersection between the projection target surface and an optical axis of the attached projection lens.

2. The image projection apparatus according to claim 1, wherein the memory is configured to store instructions that when executed by the processor, cause the image projection apparatus to produce the drive signal corresponding to another color light beam by using the information on the optical characteristic so as to reduce the display pixel shift between a display pixel formed by a reference color light among the plurality of color light beams in the projected image and a display image formed by the another color light beam.

3. The image projection apparatus according to claim 1, wherein each of the plurality of attachable projection lenses includes a lens memory configured to store the information on the optical characteristic, and wherein the memory is configured to store instructions that when executed by the processor, cause the image projection apparatus to acquire the information on the optical characteristic from the lens memory.

4. The image projection apparatus according to claim 1, wherein each of the plurality of attachable projection lenses includes a lens memory configured to store identification information used to identify the projection lens, wherein the image projection apparatus further comprises an information memory configured to store information on the optical characteristics of the plurality of attachable projection lenses, and wherein the memory is configured to store instructions that when executed by the processor, cause the image projection apparatus to acquire, from the information memory, the information on the optical characteristic corresponding to the identification information obtained from the lens memory.

5. The image projection apparatus according to claim 1, further comprising a communicator configured to engage in information communication with an external device through a wireless network or a wired network, wherein the information on the optical characteristic is acquired from the external device through the communicator.

6. The image projection apparatus according to claim 1, further comprising an exchange detector configured to detect an exchange of the projection lens in the lens attachable portion, wherein the memory is configured to store instructions that when executed by the processor, cause the image projection apparatus to produce the drive signal corresponding to the information on the optical characteristic when the exchange is detected.

7. The image projection apparatus according to claim 1, further comprising a lens shift mechanism configured to shift the projection lens attached to the lens attachable portion so as to move a projection position of the projected image, wherein the memory is configured to store instructions that when executed by the processor, cause the image projection apparatus to acquire a shift amount of the projection lens and to produce the drive signal by using the information on the optical characteristic and the acquired shift amount of the projection lens.

8. The image projection apparatus according to claim 1, wherein the memory is configured to store instructions that when executed by the processor, cause the image projection apparatus to acquire zoom information of the projection lens and to produce the drive signal by using the information on the optical characteristic and the acquired zoom information of the projection lens.

9. The image projection apparatus according to claim 1, further comprising a temperature acquirer configured to acquire a temperature of the projection lens, wherein the memory is configured to store instructions that when executed by the processor, cause the image projection apparatus to acquire temperature information representing the temperature of the projection lens and to produce the drive signal by using the information of the optical characteristic and the acquired temperature information representing the temperature of the projection lens.

10. A control method for an image projection apparatus configured to display a projected image on a projection target surface by modulating a plurality of color light beams through at least one light modulation element that includes a plurality of modulation pixels and by projecting the color light beams through a projection lens included among a plurality of attachable projection lenses having mutually different optical characteristics, the image projection apparatus including a lens attachable portion to which one of the plurality of attachable projection lenses can interchangeably be attached for use as the projection lens, the control method comprising:

producing, for each color light beam, a drive signal used to drive the at least one light modulation element based on an input image signal; and acquiring information on the optical characteristic of the projection lens attached to the lens attachable portion, wherein influence of a display pixel shift on the projected image whose amount is smaller than a size of a display pixel on the projected image caused by a chromatic aberration of the attached projection lens is reduced by producing drive signal values of modulation pixels using the information on the optical characteristic, and wherein the information on the optical characteristic indicates the amount of the display pixel shift at each of a plurality of points of the projected image, the amount of the display pixel shift being expressed as a value corresponding to a distance to each of the plurality of points of the projected image from an intersection between the projection target surface and an optical axis of the attached projection lens.

11. A non-transitory computer-readable storage medium storing an image projection control program for an image projection apparatus configured to display a projected image on a projection target surface by modulating a plurality of color light beams through at least one light modulation element that includes a plurality of modulation pixels and by projecting the color light beams through a projection lens included among a plurality of attachable projection lenses having mutually different optical characteristics, the image projection apparatus including a lens attachable portion to which one of the plurality of attachable projection lenses can interchangeably be attached for use as the projection lens, the image projection control program enabling a computer to execute:

drive signal producing processing configured to produce, for each color light beam, a drive signal used to drive the at least one light modulation element based on an input image signal; and information acquiring processing configured to acquire information on the optical characteristic of the projection lens attached to the lens attachable portion, wherein the drive signal producing processing reduces influence of a display pixel shift on the projected image whose amount is smaller than a size of a display pixel on the projected image caused by a chromatic aberration of the attached projection lens by producing drive signal values of modulation pixels using the information on the optical characteristic, and wherein the information on the optical characteristic indicates the amount of the display pixel shift at each of a plurality of points of the projected image, the amount of the display pixel shift being expressed as a value corresponding to a distance to each of the plurality of points of the projected image from an intersection between the projection target surface and an optical axis of the attached projection lens.

\* \* \* \* \*